United States Patent
Miyashita et al.

(10) Patent No.: US 8,213,522 B2
(45) Date of Patent: Jul. 3, 2012

(54) DIGITAL BROADCAST RECEIVING APPARATUS, SEMICONDUCTOR INTEGRATED CIRCUIT, AND DIGITAL BROADCAST RECEIVING METHOD

(75) Inventors: Takanori Miyashita, Osaka (JP); Shuichi Takayama, Hyogo (JP); Hiroki Tatsumoto, Osaka (JP)

(73) Assignee: Panasonic Corporation, Osaka (JP)

( * ) Notice: Subject to any disclaimer, the term of this patent is extended or adjusted under 35 U.S.C. 154(b) by 901 days.

(21) Appl. No.: 12/271,199

(22) Filed: Nov. 14, 2008

(65) Prior Publication Data
US 2009/0141182 A1 Jun. 4, 2009

(30) Foreign Application Priority Data
Dec. 3, 2007 (JP) ................................. 2007-312294

(51) Int. Cl.
*H04N 7/12* (2006.01)
(52) U.S. Cl. .................... 375/240.28; 380/212; 380/218; 370/232; 370/468; 375/240.25
(58) Field of Classification Search .................. 380/212, 380/218; 375/240.28, 240.25; 370/232, 370/468
See application file for complete search history.

(56) References Cited

U.S. PATENT DOCUMENTS

| 6,185,265 B1 * | 2/2001 | Campanella ................. 375/341 |
| 2006/0152629 A1 | 7/2006 | Hirotani et al. |
| 2010/0100923 A1 * | 4/2010 | Toiyama ....................... 725/131 |

FOREIGN PATENT DOCUMENTS

JP 2007-049460 A 2/2007

OTHER PUBLICATIONS

English language Abstract of JP 2007-049460 A.

* cited by examiner

*Primary Examiner* — Eleni Shiferaw
*Assistant Examiner* — Paul Callahan
(74) *Attorney, Agent, or Firm* — Greenblum & Bernstein, P.L.C.

(57) ABSTRACT

The digital broadcast receiving apparatus according to the present invention includes: a first decoding unit which decodes video data of a first digital broadcast and outputs first video data that is decoded; a second decoding unit which decodes video data of a second digital broadcast and outputs second video data that is decoded; and a selection unit which selects one of the first video data and the second video data, and the first decoding unit outputs the first video data synchronous with a referential clock when the first video data is selected by the selection unit, and the first decoding unit outputs the first video data with timing delayed or accelerated by as much as an offset value with respect to timing of predetermined periodicity when the first video data is not selected by the selection unit.

17 Claims, 6 Drawing Sheets

DIGITAL BROADCAST RECEIVING APPARATUS, SEMICONDUCTOR INTEGRATED CIRCUIT, AND DIGITAL BROADCAST RECEIVING METHOD

BACKGROUND OF THE INVENTION (1) Field of the Invention

The present invention relates to a digital broadcast receiving apparatus, a semiconductor integrated circuit, and a digital broadcast receiving method, and relates particularly to a digital broadcast receiving apparatus which receives a digital broadcast radio wave including a first digital broadcast and a second digital broadcast that are compressed, and which outputs the video data of the first digital broadcast or the second digital broadcast.

(2) Description of the Related Art

In digital terrestrial television broadcasting, a full-segment broadcast (hereinafter, Full Seg) for stationary apparatuses and a one-segment broadcast (hereinafter, One Seg) for portable apparatuses and mobile objects are simultaneously on air in plural segments in each channel. In other words, an identical content is simultaneously broadcast in plural segments in each channel.

As a digital broadcast receiving apparatus to be equipped on portable apparatuses and mobile objects, such as a car navigation system and an in-vehicle television, a digital broadcast receiving apparatus is suggested which receives Full Seg and One Seg and automatically determines the segment to be watched according to the receiving status of digital broadcast signals, the decompression status of the digital data, and other various conditions.

Specifically, the digital broadcast receiving apparatus selects high-definition Full Seg as a target broadcast when the receiving status is good, and selects One Seg which is lower-definition but easier to receive as the target broadcast when the receiving status is poor.

For example, a digital broadcast receiving apparatus described in Patent Reference 1 (Japanese Unexamined Patent Application Publication No. 2007-49460) is known as the digital broadcast receiving apparatus which automatically switches the target broadcast.

In addition, for the digital broadcast receiving apparatus described in Patent Reference 1, it is possible to reduce discomfort that is felt by a viewer when the target broadcast is switched, by decoding a frame having an earlier timing of display with delay, along with the decoding of a frame having a later timing of display.

Such adjustment of the frame having an earlier timing of display to the frame having a later timing, however, causes a lag in the display of the frame having an earlier timing of display behind the time at which it should actually be displayed.

For example, this causes a clock display or the like in the video to indicate the time behind the actual time.

In addition, it is preferable that the digital broadcast receiving apparatus which automatically switches the target broadcast should further reduce the amount of time required for switching the target broadcast. Specifically, the discomfort felt by the viewer at the moment of switching can be reduced through reduction of the time during which no picture is displayed.

SUMMARY OF THE INVENTION

The present invention is to solve these problems, and it is an object of the present invention to provide a digital broadcast receiving apparatus, and a digital broadcast receiving method for reducing the switching time without a delay in the timing of display.

To achieve the above object, the digital broadcast receiving apparatus according to the present invention is a digital broadcast receiving apparatus which receives a radio wave including a first digital broadcast and a second digital broadcast that are compressed and outputs video data of the first or the second digital broadcast, the digital broadcast receiving apparatus including: a receiving unit which receives the radio wave; a demodulating unit which demodulates the radio wave received by the receiving unit into a digital signal; a counter which counts a count value using a clock generated from referential clock information included in the digital signal; a first decoding unit which decodes video data of the first digital broadcast included in the digital signal and outputs first video data that is decoded; a second decoding unit which decodes video data of the second digital broadcast included in the digital signal and outputs second video data that is decoded; a selection unit which selects one of the first video data outputted by the first decoding unit and the second video data outputted by the second decoding unit; and an output unit which outputs the one of the first video data and the second video data that is selected by the selection unit, and in the digital broadcast receiving apparatus according to the present invention, the first decoding unit includes: a synchronous decoding unit which outputs, when the first video data is selected by the selection unit, the first video data when a difference between a time stamp and the count value is smaller than a predetermined value, the time stamp being included in the digital signal and indicating time at which the first video data is displayed; and an asynchronous decoding unit which outputs, when the first video data is not selected by the selection unit, the first video data with timing delayed or accelerated by as much as an offset value with respect to timing of predetermined periodicity.

According to the configuration, the first decoding unit decodes the video data to be outputted in synchronization with the reference clock. With this, in the digital broadcast receiving apparatus according to the present invention, no delay is caused in the timing of display of the video data to be outputted.

Furthermore, the first decoding unit decodes the video data of the broadcast that is not selected as the target broadcast asynchronously with the reference clock. In addition, the digital broadcast receiving apparatus according to the present invention can reduce, compared to the case where decoding starts after switching, the amount of time required for outputting video data by outputting the video data decoded by the asynchronous decoding unit.

Furthermore, the digital broadcast receiving apparatus does not use a count value of an internal counter for the decoding and outputting of the video data from the broadcast that is not selected as the target broadcast. Therefore, the digital broadcast receiving apparatus according to the present invention may include only one counter. This allows reduction of the circuit size for the digital broadcast receiving apparatus according to the present invention as compared to the case where two counters are included for the first and second digital broadcasts.

Furthermore, the asynchronous decoding unit outputs video data with timing that is delayed or accelerated by as much as the offset value with respect to the timing of predetermined periodicity. This allows adjustment of the timing of the video-data output by the asynchronous decoding unit to the reference clock. Thus, the digital broadcast receiving apparatus according to the present invention can promptly output, at the moment of switching, the video data decoded by the asynchronous decoding unit. In other words, the digital broadcast receiving apparatus according to the present invention can reduce the switching time at the moment of switching for the target broadcast.

In addition, the synchronous decoding unit may output the first video data decoded by the asynchronous decoding unit as initial video data to be outputted after the video data selected by the selection unit is switched from the second video data to the initial video data, when the difference between the time stamp for the first video data and the count value is smaller than a predetermined value.

According to the configuration, the digital broadcast receiving apparatus uses the video data outputted by the asynchronous decoding units as initial video data to be outputted after the target broadcast is switched. With this, the digital broadcast receiving apparatus according to the present invention can reduce the amount of time required for outputting video data as compared to the case where decoding starts after switching.

In addition, the asynchronous decoding unit may include an offset setting unit which sets the offset value, and the offset setting unit may include a calculating unit which calculates a difference value between the time stamp for the first video data and the count value, the first video data being decoded by the asynchronous decoding unit at time when the video data selected by the selection unit is switched from the second video data to the first video data, and the count value being obtained at the time, and the offset setting unit may set, as the offset value, the difference value calculated by the calculating unit.

According to the configuration, the digital broadcast receiving apparatus according to the present invention can measure, as an offset value, the amount of time required for outputting the video data when the status in which no picture is outputted by the synchronous decoding unit is switched to the status in which pictures are outputted. With this, the digital broadcast receiving apparatus can reduce the amount of time required for outputting the video data in the subsequent switching, thereby reducing the discomfort felt at the moment of switching.

In addition, the offset setting unit may further include: a storage unit in which the difference value is stored; and an addition unit which adds a difference value newly calculated by the calculating unit to the difference value stored in the storage unit, and stores a resulting value in the storage unit as a new difference value, and the offset setting unit may set, as the offset value, the new difference value stored in the storage unit.

According to the configuration, the digital broadcast receiving apparatus according to the present invention can use the offset value reflecting the difference value having been most recently measured as the next offset value by adding the newly-measured offset value to the offset value that is previously measured.

In addition, the offset setting unit may further include: a storage unit in which the difference value is stored; an addition unit which adds a difference value newly calculated by the calculating unit to the difference value stored in the storage unit; and an averaging unit which calculates an average value of the difference value added by the addition unit and the difference value stored in the storage unit, and stores the average value in the storage unit as a new difference value, and the offset setting unit may set, as the offset value, the new difference value stored in the storage unit.

According to the configuration, the digital broadcast receiving apparatus according to the present invention can prevent setting of an inappropriate offset value by striking an average using the previous offset value even when the calculating unit fails in the calculation of the difference value for reasons that the Carrier-Noise ratio (CN) is low due to poor radio wave condition, and so on.

In addition, the offset setting unit may further reset the offset value to a predetermined default value when the radio wave to be received by the receiving unit is changed.

According to the configuration, the digital broadcast receiving apparatus according to the present invention prevents the setting of an inappropriate offset value when the radio wave to be received is changed.

In addition, the offset setting unit may further include a plurality of storage units in each of which the difference value is stored, the plurality of storage units corresponding to respective radio waves that can be received by the receiving unit, and the difference value being calculated by the calculating unit when a corresponding radio wave is received, and the offset setting unit may set the difference value as the offset value when the radio wave to be received by the receiving unit is changed, the difference value being stored in one of the plurality of storage units that corresponds to the radio wave after the change.

According to the configuration, the digital broadcast receiving apparatus according to the present invention can set an appropriate offset value even when the radio wave to be received is changed.

In addition, the demodulating unit may convert the radio wave into a transport stream that is the digital signal.

According to the configuration, the digital broadcast receiving apparatus according to the present invention can generate video data by decoding video and sound streams included in the transport stream.

In addition, the referential clock information may be Program lo Clock Reference (PCR), and the time stamp may be Presentation Time Stamp (PTS).

According to the configuration, the digital broadcast receiving apparatus according to the present invention can control the output timing for the video data based on PCR and PTS included in the digital broadcast.

In addition, the first digital broadcast and the second digital broadcast have different picture qualities and correspond to an identical content, and the radio wave is a radio wave in which the first digital broadcast and the second digital broadcast are hierarchized in one channel to be broadcast.

According to the configuration, the digital broadcast receiving apparatus which receives a digital broadcast in which a plurality of digital broadcasts having different picture qualities and corresponding to an identical content is hierarchized in one channel to be broadcast, and which selects the digital broadcast for outputting pictures according to the radio wave status can reduce the time for the switching of the target broadcast without changing the timing of display.

In addition, the first decoding unit may perform decoding in accordance with MPEG2 or H. 264, and the second decoding unit may perform decoding in accordance with MPEG2 or H. 264.

According to the configuration, the digital broadcast receiving apparatus according to the present invention can decode video data compressed in accordance with MPEG2 or H. 264.

In addition, one of the first digital broadcast and the second digital broadcast may be a full-segment broadcast in digital terrestrial broadcasting, and an other of the first digital broadcast and the second digital broadcast may be a one-segment broadcast in digital terrestrial broadcasting.

According to the configuration, the digital broadcast receiving apparatus which decodes Full-Seg and One-Seg in digital terrestrial broadcasting can reduce the switching time for the target broadcast without changing the timing of display.

In addition, one of the first digital broadcast and the second digital broadcast may be a weak-layer broadcast in digital satellite broadcasting, and an other of the first digital broadcast and the second digital broadcast may be a strong-layer broadcast in digital satellite broadcasting.

According to the configuration, the digital broadcast receiving apparatus which decodes a weak layer and a strong layer in the digital satellite broadcasting can reduce the switching time for the target broadcast without changing the timing of display.

In addition, the first digital broadcast and the second digital broadcast may correspond to different channels; the receiving unit may receive two radio waves of different channels simultaneously; the demodulating unit may demodulate the two radio waves received by the receiving unit into a first digital signal and a second digital signal, respectively; the first decoding unit may decode the video data of the first digital broadcast included in the first digital signal and output the first video data that is decoded; and the second decoding unit may decode the video data of the second digital broadcast included in the second digital signal and output the second video data that is decoded.

According to the configuration, the digital broadcast receiving apparatus according to the present invention can reduce the amount of time required for switching channels without changing the timing of display. With this, the digital broadcast receiving apparatus according to the present invention can reduce the discomfort caused by the switching of channels.

In addition, the semiconductor integrated circuit according to the present invention is a semiconductor integrated circuit which decodes video data of a first digital broadcast and a second digital broadcast from a radio wave including the first digital broadcast and the second digital broadcast that are compressed, and outputs video data of the first or the second digital broadcast, the semiconductor integrated circuit including: a demodulating unit which demodulates the radio wave into a digital signal; a counter which counts a count value using a clock generated from referential clock information included in the digital signal; a first decoding unit which decodes video data of the first digital broadcast included in the digital signal and outputs first video data that is decoded; a second decoding unit which decodes video data of the second digital broadcast included in the digital signal and outputs second video data that is decoded; a selection unit which selects one of the first video data outputted by the first decoding unit and the second video data outputted by the second decoding unit; and an output unit which outputs the one of the first video data and the second video data that is selected by the selection unit, and in the semiconductor integrated circuit according to the present invention, the first decoding unit includes: a synchronous decoding unit which outputs, when the first video data is selected by the selection unit, the first video data when a difference between a time stamp and the count value is smaller than a predetermined value, the time stamp being included in the digital signal and indicating time at which the first video data is displayed; and an asynchronous decoding unit which outputs, when the first video data is not selected by the selection unit, the first video data with timing delayed or accelerated by as much as an offset value with respect to timing of predetermined periodicity.

According to the configuration, the first decoding unit decodes the video data to be outputted in synchronization with the reference clock. With this, in the semiconductor integrated circuit according to the present invention, no delay is caused in the timing of display of the video data to be outputted.

Furthermore, the first decoding unit decodes, asynchronously with the reference clock, the video data of the broadcast that is not selected as the target broadcast. In addition, the semiconductor integrated circuit according to the present invention can reduce the amount of time required for outputting the video data as compared to the case where decoding starts after switching, by outputting the video data decoded by the asynchronous decoding unit.

Furthermore, the semiconductor integrated circuit does not use a count value of an internal counter for the decoding and outputting of the video data from the broadcast that is not selected as the target broadcast. Therefore, the semiconductor integrated circuit according to the present invention may include only one counter. This allows reduction of the circuit size of the semiconductor integrated circuit according to the present invention as compared to the case where two counters are included for the first and the second digital broadcasts.

Furthermore, the asynchronous decoding unit outputs video data with timing that is delayed or accelerated by as much as the offset value with respect to the timing of predetermined periodicity. This allows adjustment of the timing of the video-data output by the asynchronous decoding unit to the reference clock. Therefore, the semiconductor integrated circuit according to the present invention can promptly output, at the moment of switching, the video data decoded by the asynchronous decoding unit. In other words, the semiconductor integrated circuit according to the present invention can reduce the switching time at the moment of switching the target broadcast.

In addition, a digital broadcast receiving method for use in a digital broadcast receiving apparatus which decodes video data of a first digital broadcast and a second digital broadcast from a radio wave including the first and the second digital broadcasts that are compressed, and outputs video data of the first or the second digital broadcast, and the digital broadcast receiving apparatus includes: a demodulating unit which demodulates the radio wave into a digital signal; a counter which counts a count value using a clock generated from referential clock information included in the digital signal; a first decoding unit which decodes video data of the first digital broadcast included in the digital signal and outputs first video data that is decoded; a second decoding unit which decodes video data of the second digital broadcast included in the digital signal and outputs second video data that is decoded; a selection unit which selects one of the first video data outputted by the first decoding unit and the second video data outputted by the second decoding unit; and an output unit which outputs the one of the first video data and the second video data that is selected by the selection unit, and the digital broadcast receiving method includes: causing the first decoding unit to output, when the first video data is selected by the selection unit, the first video data when a difference between a time stamp and the count value is smaller than a predetermined value, the time stamp being included in the digital signal and indicating time at which the first video data is displayed; and causing the first decoding unit to output, when the first video data is not selected by the selection unit, the first video data with timing delayed or accelerated by as much as an offset value with respect to the timing of predetermined periodicity.

According to the configuration, the first decoding unit decodes the video data to be outputted in synchronization with the reference clock. With this, in the digital broadcast receiving method according to the present invention, no delay is caused in the timing of display of the video data to be outputted.

Furthermore, the first decoding unit decodes, asynchronously with the reference clock, the video data of the broadcast that is not selected as the target broadcast, and output the decoded video data. In addition, the digital broadcast receiving method according to the present invention can reduce the amount of time required for outputting the video data as compared to the case where decoding starts after switching, by outputting the video data decoded by the asynchronous decoding unit.

Furthermore, the digital broadcast receiving method does not use a count value of an internal counter for the decoding and outputting of the video data from the broadcast that is not selected as the target broadcast. Therefore, the digital broadcast receiving apparatus using the digital broadcast receiving method according to the present invention may include only one counter. This allows reduction of the circuit size for the digital broadcast receiving apparatus using the digital broadcast receiving method according to the present invention, as compared to the case where two counters are included for the first and second digital broadcasts.

Furthermore, the asynchronous decoding unit outputs video data with timing delayed or accelerated by as much as the offset value with respect to the timing of predetermined periodicity. With this, it is possible to adjust to the referential clock, the timing of the video-data output from the first decoding unit when the broadcast is not selected as the target broadcast. Therefore, the digital broadcast receiving method according to the present invention allows prompt outputting, at the moment of switching, of the video data decoded by the asynchronous decoding unit. In other words, the digital broadcast receiving method according to the present invention can reduce the switching time at the moment of switching the target broadcast.

Note that the present invention can be implemented not only as such a digital broadcast receiving apparatus and a semiconductor integrated circuit but also as a digital broadcast receiving method including, as steps, characteristic units included in the digital broadcast receiving apparatus, and as a program which causes a computer to execute such characteristic steps. Furthermore, it goes without saying that such a program can be distributed through the recoding media such as CD-ROMs and the communication media such as the Internet.

As described thus far, the present invention can provide a digital broadcast receiving apparatus, and a digital broadcast receiving method for reducing the switching time without causing a delay in the timing of display.

FURTHER INFORMATION ABOUT TECHNICAL BACKGROUND TO THIS APPLICATION

The disclosure of Japanese Patent Application No. 2007-312294 filed on Dec. 3, 2007 including specification, drawings and claims is incorporated herein by reference in its entirety.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

Hereinafter, an embodiment of the digital broadcast receiving apparatus according to the present invention shall be described in detail with reference to the drawings. Note that since those skilled in the art already know the basic structure, operations, and so on of the digital broadcast receiving apparatus, the detailed description shall be omitted.

In addition, described here as an embodiment is the case where Full Seg and One Seg are simultaneously broadcast in one channel including plural layers (segments) in digital terrestrial television broadcasting.

In digital terrestrial broadcasting, one channel is divided into 13 segments. Of the 13 segments, 12 segments are assigned to Full Seg (high-resolution digital broadcasting), and one segment is assigned to One Seg. In addition, 4 segments are assigned to broadcasts of ordinary definition.

One Seg is low-definition compared to Full Seg but easy to receive even when the radio wave condition is poor. In addition, an identical content is broadcast in One Seg and Full Seg.

Furthermore, in digital terrestrial broadcasting, compressed video data is transmitted. The compression format is MPEG2 for Full Seg, and H. 264 for One Seg.

First, the configuration of the digital broadcast receiving apparatus according to the embodiment of the present invention shall be described.

An exemplary digital broadcast receiving apparatus according to the embodiment of the present invention is the digital broadcast receiving apparatus included in a car navigation system or an in-vehicle television. Note that the digital broadcast receiving apparatus according to the embodiment of the present invention may also be applied to a portable television, a note-type personal computer with a television function, a personal digital assistant (PDA), a cellular phone, and so on.

Figure 1:
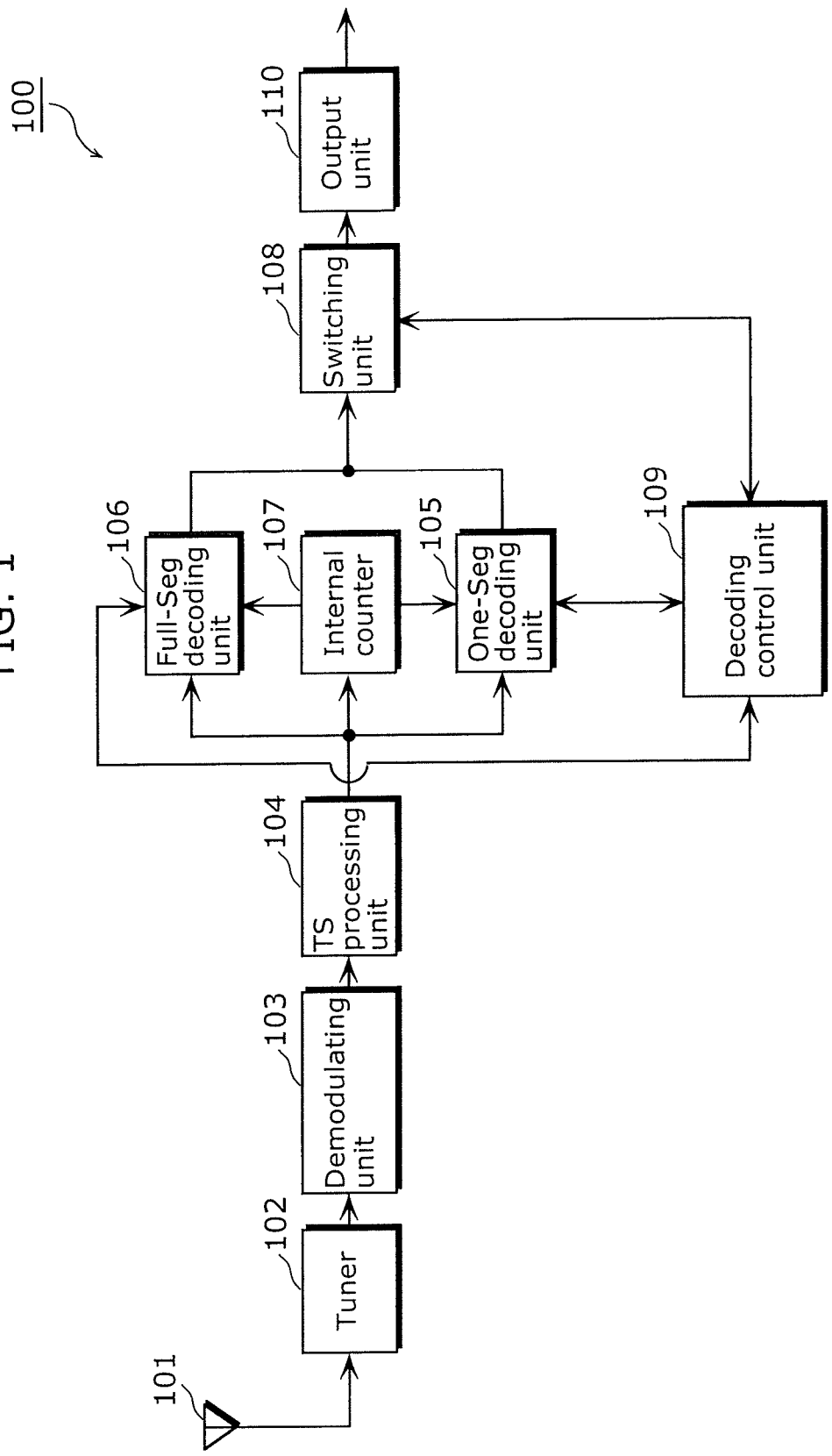
FIG. 1 is a block diagram showing a functional configuration of a digital broadcast receiving apparatus according to an embodiment of the present invention.

FIG. 1 is a block diagram showing a functional configuration of a digital broadcast receiving apparatus according to the embodiment of the present invention.

A digital broadcast receiving apparatus 100 shown in FIG. 1 receives a radio wave of digital terrestrial broadcasting in which Full Seg and One Seg are hierarchized in one channel and transmitted. The digital broadcast receiving apparatus 100 decodes Full-Seg and One-Seg video data in parallel from the received radio wave, and selectively outputs decoded Full-Seg or One-Seg video data.

The digital broadcast receiving apparatus 100 includes: a receiving antenna 101, a tuner 102, a demodulating unit 103, a Transport Stream (TS) processing unit 104, a One-Seg decoding unit 105, a Full-Seg decoding unit 106, an internal counter 107, a switching unit 108, a decoding control unit 109, and an output unit 110.

The receiving antenna 101 is an antenna which receives radio waves of digital terrestrial broadcasting.

The tuner 102 receives radio waves of digital terrestrial broadcasting through the receiving antenna 101. The tuner 102 extracts a radio wave of a specific frequency band from the radio waves received by the receiving antenna 101. In other words, the tuner 102 selects a predetermined channel for digital terrestrial broadcasting, and extracts the radio wave from the predetermined channel.

The demodulating unit 103 demodulates the radio wave having been extracted by the tuner 102, into a digital signal. Specifically, the demodulating unit 103 converts the radio wave extracted by the tuner 102 into a transport stream made up of transport stream packets (TS packets).

The TS processing unit 104 separates the data included in the digital signal that is demodulated by the demodulating unit 103. Specifically, each of the TS packets corresponds to the video data, broadcasting information, or the like. The TS processing unit 104 separates the TS packets demodulated by the demodulating unit 103 and included in the transport stream, into video data and broadcasting information.

The One-Seg decoding unit 105 decodes, into video data, the data to be used for One Seg from among plural data having been separated by the TS processing unit 104. In other words, the One-Seg decoding unit 105 decodes the data in which One-Seg video data is compressed, from among the plural data having been separated by the TS processing unit 104.

The One-Seg decoding unit 105 performs decoding in accordance with H. 264. Specifically, the One-Seg decoding unit 105: generates a quantized orthogonal transform coefficient through variable length decoding of the separated data; generates a difference pixel value by performing an inverse quantization process and an inverse orthogonal transform process on the quantized orthogonal transform coefficient; generates predictive image data from reference images; and generates video data from the difference pixel value and the predictive image data. In addition, the One-Seg decoding unit 105 performs a deblocking filtering process as specified by H. 264. The deblocking filtering process is a filtering process for reducing noise generated on a boundary of a macroblock that is a unit of processing for decoding within a picture.

The One-Seg decoding unit 105 outputs the decoded video data to the switching unit 108.

The Full-Seg decoding unit 106 decodes data to be used for Full Seg from among the plural data having been separated by the TS processing unit 104. In other words, the Full-Seg decoding unit 106 decodes the data in which Full-Seg video data is compressed, from among the plural data having been separated by the TS processing unit 104.

The Full-Seg decoding unit 106 performs decoding in accordance with MPEG2. Specifically, the Full-Seg decoding unit 106: generates a quantized orthogonal transform coefficient through variable length decoding of the separated data; generates a difference pixel value by performing an inverse quantization process and an inverse orthogonal transform process on the quantized orthogonal transform coefficient; generates predictive image data from reference images; and generates video data from the difference pixel value and the predictive image data.

The Full-Seg decoding unit 106 outputs the decoded video data to the switching unit 108.

In addition, the One-Seg decoding unit 105 and the Full-Seg decoding unit 106 decode in parallel One-Seg video data and Full-Seg video data, respectively, and output the decoded video data to the switching unit 108.

The internal counter 107 generates an internal clock that is synchronous with the Program Clock Reference (PCR) included in the data separated by the TS processing unit 104. The internal counter 107 counts the count value in synchronization with the generated internal clock. The PCR is information indicating referential time for a program, and is information on the referential clock when time synchronization is performed at the transmitting and the receiving sides in the transmission and receiving of the transport streams. In addition, the count value counted by the internal counter 107 is specifically the System Time Clock (STC). That is, the internal counter 107 restores the STC from the PCR.

In addition, the internal counter 107 generates an internal clock that is synchronous with the PCR corresponding to Full Seg when the target broadcast is Full Seg, and generates an internal clock synchronous with the PCR corresponding to One Seg when the target broadcast is One Seg.

The switching unit 108 selects the video data generated by either the One-Seg decoding unit 105 or the Full-Seg decoding unit 106, and outputs the selected video data to the output unit 110. In other words, the switching unit 108 switches the video data (One-Seg or Full-Seg) outputted from the digital broadcast receiving apparatus 100.

The control decoding unit 109 instructs the switching unit 108 to switch between Full Seg and One Seg, according to the receiving status of the digital broadcast signal, the decompression status of the digital data, and so on. Specifically, the decoding control unit 109 causes the switching unit 108 to select Full Seg in the case where the receiving status of the digital broadcast signal is good and where the decompression status of the Full-Seg video data satisfies a predetermined level in the Full-Seg decoding unit 106. The decoding control unit 109 causes the switching unit 108 to select One Seg in the case where the receiving status of the digital broadcast signal is poor and where the decompression status of the Full-Seg video data does not satisfy a predetermined level. Note that the decoding control unit 109 may switch the target broadcast based on the operation by the viewer.

In addition, when causing the switching unit 108 to select Full Seg, the decoding control unit 109 instructs the Full-Seg decoding unit 106 to perform clock-synchronous decoding, while instructing the One-Seg decoding unit 105 to perform asynchronous decoding. In other words, each of the One-Seg decoding unit 105 and the Full-Seg decoding unit 106 performs clock-synchronous decoding when video data outputted by the current one of the decoding units is selected by the switching unit 108, whereas performing asynchronous decoding when such video data is not selected.

Here, clock-synchronous decoding is a process for outputting decoded video data with timing synchronized with the count value of the internal counter 107. Specifically, clock-synchronous decoding is a process for outputting video data decoded at the timing that allows the difference between the Presentation Time Stamp (PTS) included in the video data and the count value of the internal counter 107 to be smaller than a predetermined value. The PTS is time information for synchronous reproduction of video and sound, and is a time stamp indicating the time at which to display the video data (video and sound). For example, in clock-synchronous decoding, One-Seg video data is outputted with a period of 66 msec, and Full-Seg video data is outputted with a period of 33 msec.

In addition, asynchronous decoding is a process for outputting video data asynchronously with the count value of the internal counter 107. Asynchronous decoding is a process for outputting decoded video data at regular intervals delayed or accelerated by as much as a predetermined offset value with respect to the timing of predetermined periodicity. The predetermined periodicity is approximately equal to the periodicity with which the video data is outputted in clock-synchronous decoding. For example, the predetermined periodicity is: 66 msec for One Seg and 33 msec for Full Seg. In addition, the timing of the video-data output in asynchronous decoding (timing of predetermined periodicity) is determined by a local clock different from the count value of the internal counter 107.

In addition, when causing the switching unit 108 to select One Seg, the decoding control unit 109 instructs the One-Seg decoding unit 105 to perform clock-synchronous decoding, while instructing the Full-Seg decoding unit 106 to perform asynchronous decoding.

The output unit 110 outputs the video data selected by the switching unit 108. The video data outputted by the output unit 110 is displayed, for example, in an in-vehicle display unit (display).

Here, the demodulating unit 103, the TS processing unit 104, the One-Seg decoding unit 105, the Full-Seg decoding unit 106, the internal counter 107, the switching unit 108, the decoding control unit 109, and the output unit 110 are formed into a semiconductor integrated circuit including a single chip or plural chips. Note that the function to be implemented by each of the processing units may be implemented through a dedicated circuit (hardware) formed in the semiconductor integrated circuit, and may also be implemented through execution of a program (software) by a CPU or the like.

Figure 2:
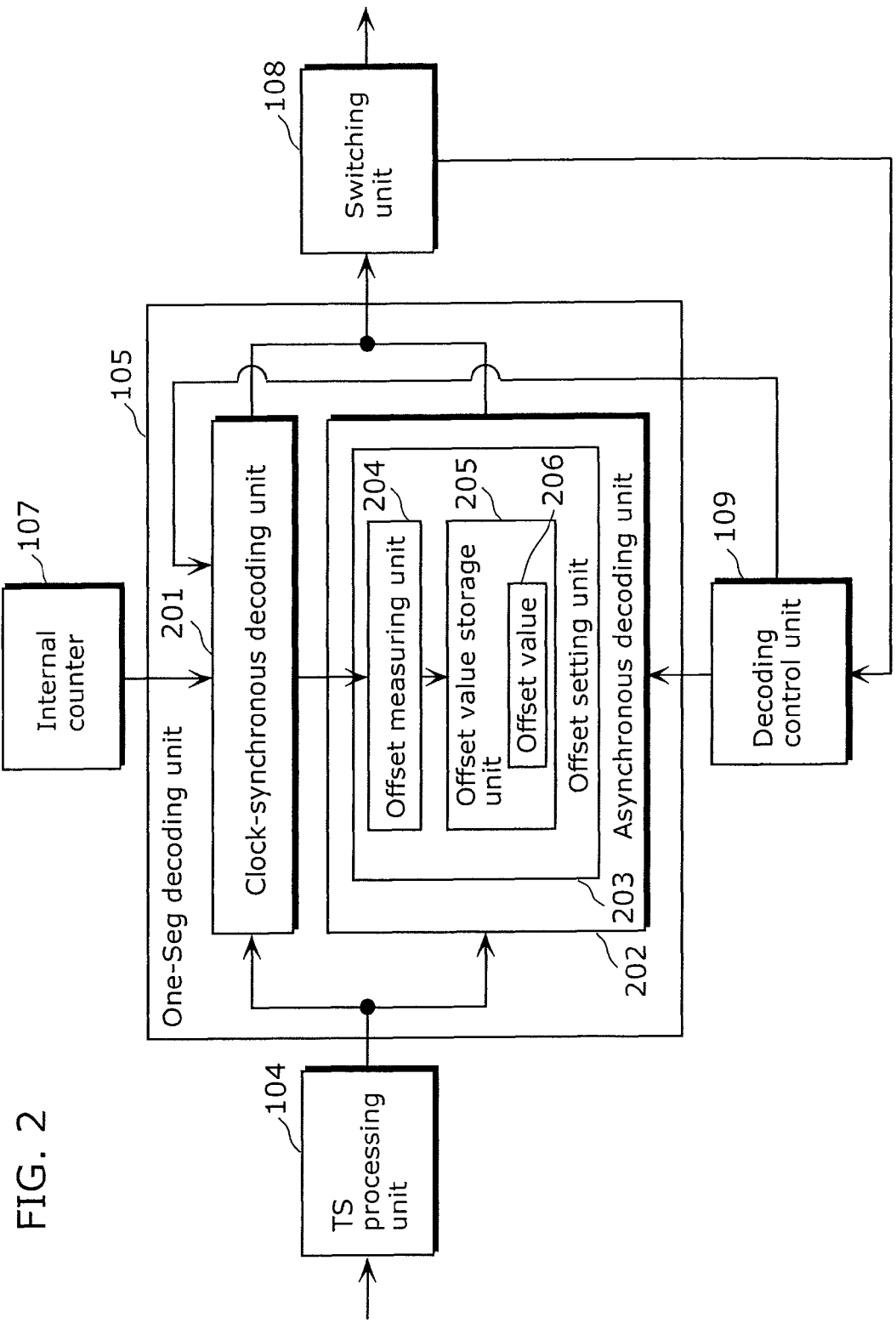
FIG. 2 is a block diagram showing a functional configuration of a One-Seg decoding unit according to the embodiment of the present invention.

FIG. 2 is a block diagram showing the detailed configuration of the One-Seg decoding unit 105. The One-Seg decoding unit 105 includes a clock-synchronous decoding unit 201 and an asynchronous decoding unit 202.

The clock-synchronous decoding unit 201 performs clock-synchronous decoding. Specifically, the clock-synchronous decoding unit 201 decodes One-Seg data having been separated by the TS processing unit 104. The clock-synchronous decoding unit 201 outputs the decoding result when the difference between the PTS included in the data and the count value of the internal counter 107 is smaller than a predetermined value. In other words, the clock-synchronous decoding unit 201 outputs video data synchronously with the timing indicated by the PCR.

The asynchronous decoding unit 202 performs asynchronous decoding. Specifically, the asynchronous decoding unit 202 decodes One-Seg data separated by the TS processing unit 104. The asynchronous decoding unit 202 outputs decoded video data asynchronously with the timing indicated by the PCR.

The asynchronous decoding unit 202 includes an offset setting unit 203.

The offset setting unit 203 sets an offset value. The offset value indicates an amount of time from the time at which the target broadcast is switched to the time at which the video data of the broadcast after the switching is outputted.

The asynchronous decoding unit 202 outputs decoded video data at regular intervals delayed or accelerated by as much as the offset value that is set by the offset setting unit 203 with respect to the timing of predetermined periodicity.

In addition, the offset value set by the offset setting unit 203 includes information indicating with which timing, that is, later or earlier than the timing of predetermined periodicity, the video data should be outputted. For example, the asynchronous decoding unit 202 outputs the video data with timing delayed by as much as the offset value with respect to the timing of predetermined periodicity when the offset value is positive, and outputs the video data with timing accelerated by as much as the offset value with respect to the timing of predetermined periodicity when the offset value is negative.

The offset setting unit 203 includes an offset measuring unit 204 and an offset value storage unit 205.

The offset measuring unit 204 measures an amount of time from the time at which the target broadcast is switched from Full Seg to One Seg by the switching unit 108 to the time at which the video data is outputted by the One-Seg decoding unit 105. Specifically, the offset measuring unit 204 measures the amount of time that elapses before the video data is outputted (difference value) by calculating a difference value between the PTS included in the video data decoded by the asynchronous decoding unit 202 and the count value of the internal counter 107 that is counted at the time when the decoding control unit 109 switches the decoding unit that is to perform the decoding process, from the asynchronous decoding unit 202 to the clock-synchronous decoding unit 201.

The offset value storage unit 205 stores the amount of time (difference value) measured by the offset measuring unit 204 as an offset value 206.

The offset setting unit 203 sets the amount of time measured by the offset measuring unit 204 as the offset value to be used at the asynchronous decoding unit 202 when the target broadcast is subsequently switched from One Seg to Full Seg.

In addition, the offset setting unit 203 measures an amount of time required for outputting the video data, and updates the offset value 206 in every switching of the target broadcast from Full Seg to One Seg by the switching unit 108. Specifically, the offset setting unit 203 adds the amount of time required for outputting the video data, which is newly measured by the offset measuring unit 204, to the offset value 206 stored in the offset value storage unit 205, and stores the added value in the offset value storage unit 205 as a new offset value 206.

The offset value 206 thus updated is used at the asynchronous decoding unit 202 when the target broadcast is subsequently switched from One Seg to Full Seg.

The clock-synchronous decoding unit 201 outputs the video data decoded by the asynchronous decoding unit 202 as initial video data that is outputted after the video data selected by the switching unit 108 is switched from the video data outputted by the Full-Seg decoding unit 106 to the video data outputted by the One-Seg decoding unit 105. The clock-synchronous decoding unit 201 outputs the video data decoded by the asynchronous decoding unit 202 when the difference between the PTS included in the video data decoded by the asynchronous decoding unit 202 and the count value of the internal counter 107 is smaller than a predetermined value.

In addition, either the clock-synchronous decoding unit 201 or the asynchronous decoding unit 202 performs the decoding process. The decoding control unit 109 selects which decoding unit to use, the clock-synchronous decoding unit 201 or the asynchronous decoding unit 202.

Figure 3:
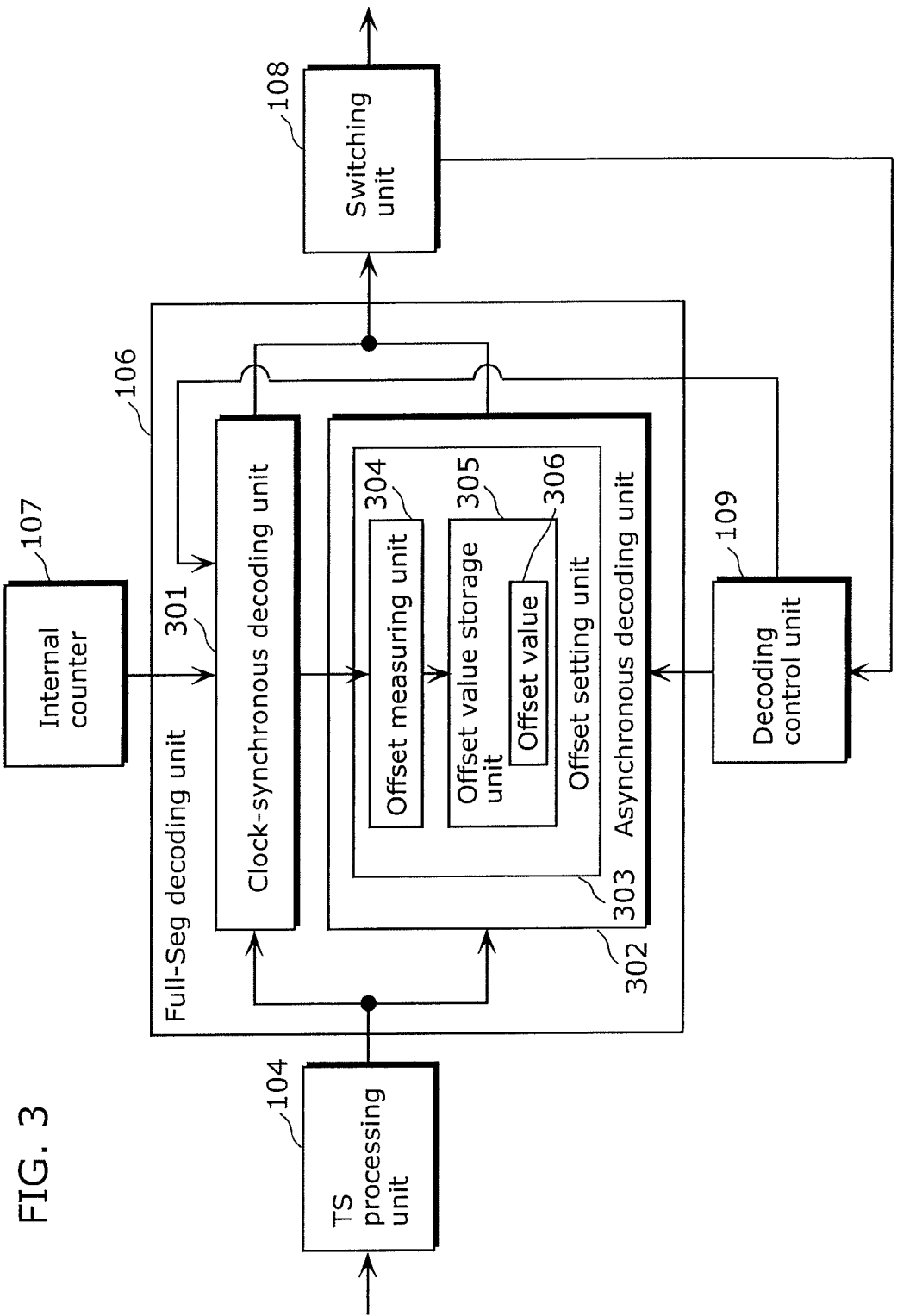
FIG. 3 is a block diagram showing a functional configuration of a Full-Seg decoding unit according to the embodiment of the present invention.

FIG. 3 is a block diagram showing the detailed configuration of the Full-Seg decoding unit 106. The configuration of the Full-Seg decoding unit 106 is the same as the One-Seg decoding unit 105, except that the data to be decoded is different. The Full-Seg decoding unit 106 includes a clock-synchronous decoding unit 301 and an asynchronous decoding unit 302.

The clock-synchronous decoding unit 301 performs clock-synchronous decoding. Specifically, the clock-synchronous decoding unit 301 decodes Full-Seg data having been separated by the TS processing unit 104. The clock-synchronous decoding unit 301 outputs the decoding result when the difference between the PTS included in the data and the count value of the internal counter 107 is smaller than a predetermined value. In other words, the clock-synchronous decoding unit 301 outputs video data with timing that is synchronous with the timing indicated by the PCR.

The asynchronous decoding unit 302 performs asynchronous decoding. Specifically, the asynchronous decoding unit 302 decodes Full-Seg data having been separated by the TS processing unit 104. The asynchronous decoding unit 302 outputs decoded video data asynchronously with respect to the timing indicated by the PCR.

The asynchronous decoding unit 302 includes an offset setting unit 303.

The offset setting unit 303 sets an offset value. The offset value indicates an amount of time from the time at which the target broadcast is switched to the time at which the video data of the broadcast after the switching is outputted.

The asynchronous decoding unit 302 outputs the decoding result at regular intervals delayed or accelerated by as much as a predetermined offset value that is set by the offset setting unit 303, with respect to the timing of predetermined periodicity.

In addition, the offset value set by the offset setting unit 303 includes information indicating with which timing, that is, later or earlier than the timing of predetermined periodicity, the video data should be outputted. For example, the asynchronous decoding unit 302 outputs the video data with timing delayed by as much as the offset value with respect to the timing of predetermined periodicity when the offset value is positive, and outputs the video data with timing accelerated by as much as the offset value with respect to the timing of predetermined periodicity when the offset value is negative.

The offset setting unit 303 includes an offset measuring unit 304 and an offset value storage unit 305.

The offset measuring unit 304 measures an amount of time from the time at which the target broadcast is switched from Full Seg to One Seg by the switching unit 108 to the time at which the video data is outputted by the Full-Seg decoding unit 106. Specifically, the offset measuring unit 304 measures the amount of time required for outputting the video data (difference value) by calculating a difference value between the PTS included in the video data decoded by the asynchronous decoding unit 302 and the count value of the internal counter 107 at the time when the decoding control unit 109 switches the decoding unit that is to perform the decoding process, from the asynchronous decoding unit 302 to the clock-synchronous decoding unit 301.

The offset value storage unit 305 stores the amount of time measured by the offset measuring unit as an offset value 306.

The offset setting unit 303 sets the amount of time measured by the offset measuring unit 304 as the offset value to be used at the asynchronous decoding unit 302 when the target broadcast is subsequently switched from One Seg to Full Seg.

In addition, the offset setting unit 303 measures the amount of time required for outputting the video data and updates the offset value 306 in every switching of the target broadcast from Full Seg to One Seg by the switching unit 108. Specifically, the offset setting unit 303 adds the amount of time required for outputting the video data, which is newly measured by the offset measuring unit 304, to the offset value 306 stored in the offset value storage unit 305, and stores the added value in the offset value storage unit 305 as a new offset value 306.

The offset value 306 thus updated is used at the asynchronous decoding unit 302 when the target broadcast is subsequently switched from One Seg to Full Seg.

The clock-synchronous decoding unit 301 outputs the video data decoded by the asynchronous decoding unit 302 as initial video data that is outputted after the video data selected by the switching unit 108 is switched from the video data outputted by the One-Seg decoding unit 105 to the video data outputted by the Full-Seg decoding unit 106. The clock-synchronous decoding unit 301 outputs the video data decoded by the asynchronous decoding unit 302 when the difference between the PTS included in the video data decoded by the asynchronous decoding unit 302 and the count value of the internal counter 107 is smaller than a predetermined value.

In addition, either the clock-synchronous decoding unit 301 or the asynchronous decoding unit 302 performs the decoding process. The decoding control unit 109 selects which decoding unit to use, the clock-synchronous decoding unit 301 or the asynchronous decoding unit 302.

Next, the operation of the digital broadcast receiving apparatus 100 shall be described.

Figure 4:
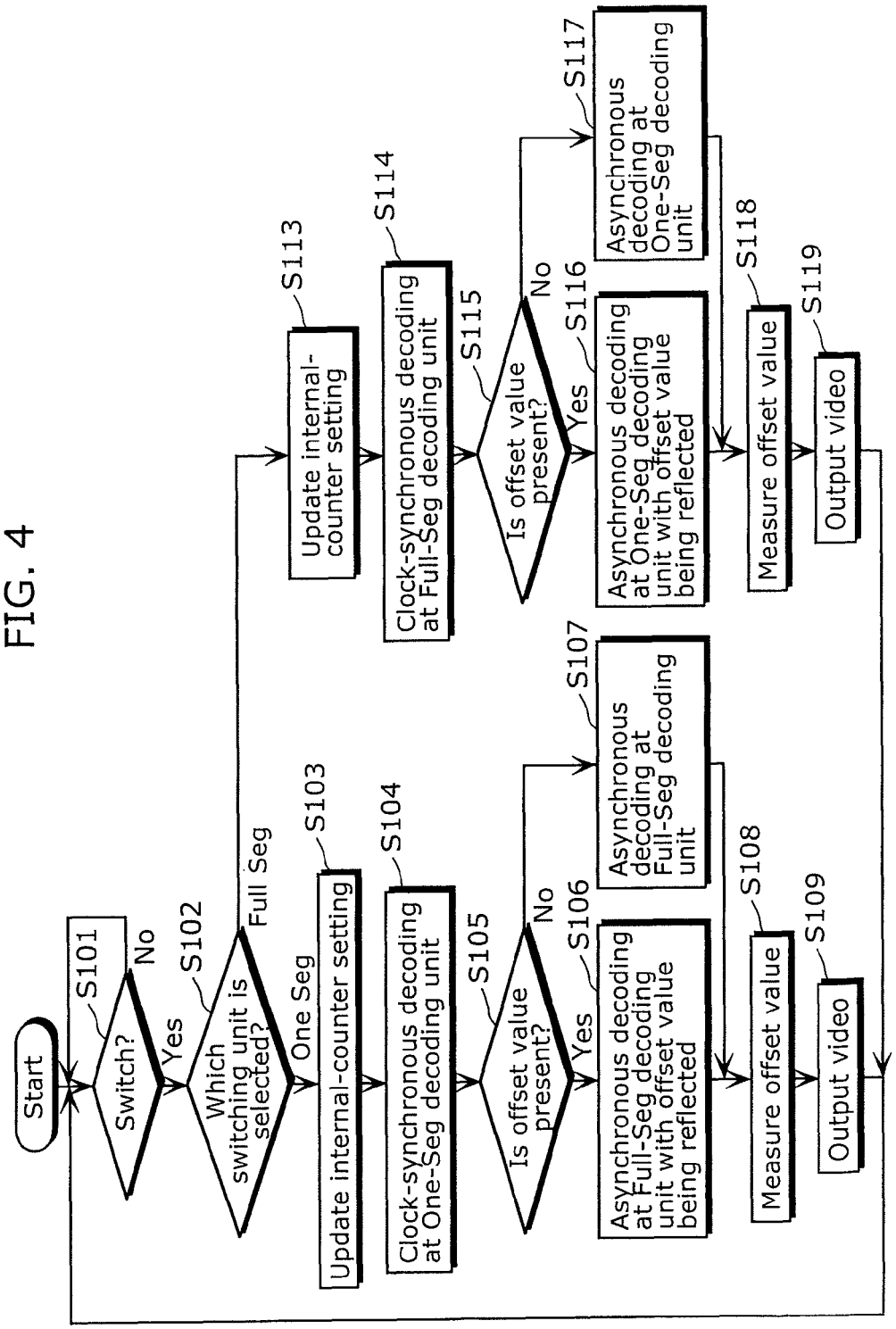
FIG. 4 is a flowchart showing the flow of the process by the digital broadcast receiving apparatus according to the embodiment of the present invention.

FIG. 4 is a flowchart showing the flow of the operation of the digital broadcast receiving apparatus 100. The flowchart shown in FIG. 4 shows a status in which the digital broadcast receiving apparatus 100 has already been receiving a broadcast.

First, the decoding control unit 109 detects whether or not the switching of the target broadcast has occurred (S101).

In the case where the switching of the target broadcast has occurred (Yes in S101), the decoding control unit 109 judges which of One Seg and Full Seg is being selected by the switching unit 108 as the target broadcast after the switching. In other words, the decoding control unit 109 judges whether the target broadcast is switched from Full Seg to One Seg or switched from One Seg to Full Seg.

When One Seg is selected by the switching unit 108 (One Seg in S102), the PCR for One Seg is obtained out of the digital data having been separated by the TS processing unit 104, and the setting of the internal counter 107 is updated (S103). The internal counter 107 generates an internal clock that is synchronous with the PCR for One Seg. The internal counter 107 counts the count value in synchronization with the generated internal clock.

Next, for the method of decoding by the One-Seg decoding unit 105, the decoding control unit 109 instructs the clock-synchronous decoding unit 201 to perform clock-synchronous decoding (S104).

In addition, the decoding control unit 109 judges whether or not the offset value 306 is stored in the offset value storage unit 305 in the Full-Seg decoding unit 106 (S105).

For the method of decoding by the Full-Seg decoding unit 106, the decoding control unit 109 instructs the asynchronous decoding unit 302 to perform asynchronous decoding. Specifically, when the offset value 306 is stored (Yes in S105), the decoding control unit 109 instructs the Full-Seg decoding unit 106 to perform asynchronous decoding in which the offset value 306 is reflected (S106). On the other hand, when the offset value 306 is not stored (No in S105), the decoding control unit 109 instructs the Full-Seg decoding unit 106 to perform asynchronous decoding in which the offset value 306 is not reflected (S107).

The One-Seg decoding unit 105 starts decoding using the decoding method instructed in step S103. The Full-Seg decoding unit 106 starts a decoding process using the decoding method instructed in step S106 or S107. Specifically, the One-Seg decoding unit 105 performs clock-synchronous decoding on the One-Seg data having been separated by the TS processing unit 104. The Full-Seg decoding unit 106 performs asynchronous decoding on the Full-Seg data having been separated by the TS processing unit 104.

Next, the offset measuring unit 204 in the One-Seg decoding unit 105 measures the offset value (S108). Specifically, the offset measuring unit 204 measures an amount of time from the time at which the switching occurs in S101 to the time at which the video data is outputted by the One-Seg decoding unit 105. The offset setting unit 203 stores the amount of the time measured by the offset measuring unit 204 in the offset value storage unit 205 as an offset value 206. In addition, when the offset value 206 is already stored, the offset setting unit 203 adds the measured amount of time to the offset value 206 stored in the offset value storage unit 205, and stores the added value in the offset value storage unit 205 as a new offset value 206.

The output unit 110 outputs the video data decoded by the One-Seg decoding unit 105 (S109).

Note that in FIG. 4 the digital broadcast receiving apparatus 100 performs the process in an order starting from step S103 to step S107, but the processing order for the steps from S103 to S107 may be arbitrary. Furthermore, a part or all of the processing from steps S103 to S107 may be performed at the same time.

Meanwhile, when Full Seg is selected by the switching unit 108 (Full Seg in S102), the PCR for Full Seg is obtained out of the digital data having been separated by the TS processing unit 104, and the setting of the internal counter 107 is updated (S113). The internal counter 107 generates an internal clock that is synchronous with the PCR for Full Seg. The internal counter 107 counts the count value in synchronization with the generated internal clock.

Next, for the decoding method by the Full-Seg decoding unit 106, the decoding control unit 109 instructs the clock-synchronous decoding unit 301 to perform clock-synchronous decoding (S114).

In addition, the decoding control unit 109 judges whether or not the offset value 206 is stored in the offset value storage unit 205 in the One-Seg decoding unit 105.

For the method of decoding by the One-Seg decoding unit 105, the decoding control unit 109 instructs the asynchronous decoding unit 202 to perform asynchronous decoding. Specifically, when the offset value 206 is stored (Yes in S115), the decoding control unit 109 instructs the One-Seg decoding unit 105 to perform asynchronous decoding in which the offset value 206 is reflected (S116). On the other hand, when the offset value 206 is not stored (No in S115), the decoding control unit 109 instructs the One-Seg decoding unit 105 to perform asynchronous decoding in which the offset value 206 is not reflected (S117).

The Full-Seg decoding unit 106 starts decoding using the decoding method instructed in step S113. The One-Seg decoding unit 105 starts decoding using the decoding method instructed in step S116 or S117. Specifically, the Full-Seg decoding unit 106 performs clock-synchronous decoding on the Full-Seg data having been separated by the TS processing unit 104. The One-Seg decoding unit 105 performs asynchronous decoding on the One-Seg data having been separated by the TS processing unit 104.

Next, the offset measuring unit 304 in the Full-Seg decoding unit 106 measures the offset value (S118). Specifically, the offset measuring unit 304 measures an amount of time from the time at which the switching occurs in S101 to the time at which the video data is outputted by the Full-Seg decoding unit 106. The offset setting unit 303 stores the amount of the time measured by the offset measuring unit 304 in the offset value storage unit 305 as an offset value 306. In addition, when the offset value 306 is already stored, the offset setting unit 303 adds the measured amount of time to the offset value 306 stored in the offset value storage unit 305, and stores the added value in the offset value storage unit 305 as a new offset value 306.

The output unit 110 outputs the video data decoded by the Full-Seg decoding unit 106 (S119).

Note that in FIG. 4, the digital broadcast receiving apparatus 100 performs the processing in an order starting from step S113 to step S117, but the processing order for the steps from S113 to S117 may be arbitrary. Furthermore, a part or all of the processing from steps S113 to S117 may be performed at the same time.

Next, the operation of the digital broadcast receiving apparatus 100 when the target broadcast is switched shall be described with reference to FIG. 5.

Figure 5:
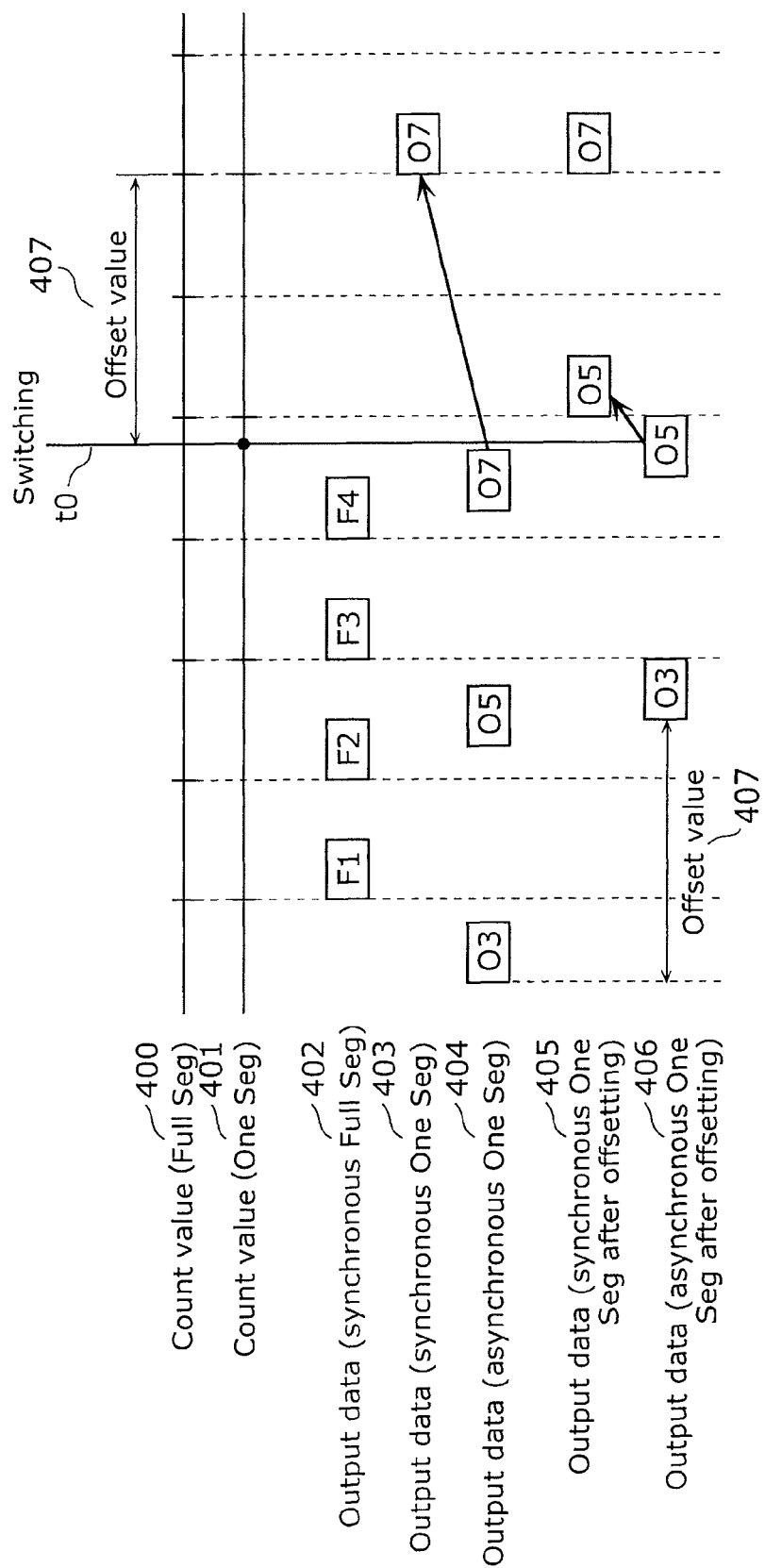
FIG. 5 is a diagram showing the video data outputted when the target broadcast is switched, in the digital broadcast receiving apparatus according to the embodiment of the present invention.

FIG. 5 is a diagram showing video data outputted by the digital broadcast receiving apparatus 100 when the target broadcast is switched.

A count value 400 shown in FIG. 5 is counted by the internal counter 107 based on the PCR for Full Seg, and the count value 401 is counted by the internal counter 107 based on the PCR for One Seg. Note that the timings of the count values 400 and 401 are not necessarily coincident but assumed as coincident in FIG. 5 for simplicity of description. In addition, the data-output interval indicated by the count value 400 is approximately half the length of the data-output interval indicated by the counter value 401. Specifically, One-Seg data (each picture) is outputted with a period of approximately 66 msec, and Full-Seg data (each picture) is outputted with a period of approximately 33 msec.

Note that the count value 401 is shown in FIG. 5 for reference although the internal counter 107 does not count the count value 401 before time t0. Likewise, the internal counter 107 does not count the count value 400 after time t0, but the count value 400 is shown in FIG. 5 for reference.

The output data 402 is a picture outputted by the clock-synchronous decoding unit 301 in the Full-Seg decoding unit 106. The output data 403 is a picture outputted by the clock-synchronous decoding unit 201 in the One-Seg decoding unit 105. The output data 404 is a picture outputted by the asynchronous decoding unit 202 in the One-Seg decoding unit 105. In addition, the output data 403 and 404 represent the output data that is not offset with the offset value 206.

The output data 405 is a picture that is offset with the offset value 206 and outputted by the clock-synchronous decoding unit 201. The output data 406 is a picture that is offset with the offset value 206 and outputted by the asynchronous decoding unit 202.

In addition, in FIG. 5, Full Seg is selected as the target broadcast before time t0, and the target broadcast is switched from Full Seg to One Seg at time t0.

Before time t0, the internal counter 107 counts the count value 400 based on the PCR for Full Seg.

Before time t0, the clock-synchronous decoding unit 301 in the Full-Seg decoding unit 106 serially outputs pictures F1, F2, F3, and F4 with a period of 33 msec. Specifically, the Full-Seg decoding unit 106 outputs pictures F1, F2, F3, and F4 with timing that allows coincidence of the count value 400 and PTSs for the pictures F1, F2, F3, and F4.

In addition, before time t0, the asynchronous decoding unit 202 in the One-Seg decoding unit 105 outputs pictures O3, O5, and O7 serially with a period of 66 msec. Note that the timing of output of pictures O3, O5, and O7 by the asynchronous decoding unit 202 has no relevance to the count values 400 and 401.

Note that picture F3 and picture O3 correspond to each other. In addition, pictures O5 and O7 correspond to pictures F5 and F7 subsequent to picture F4, respectively, and are decoded by the clock-synchronous decoding unit 301 when switching does not occur. Here, the corresponding pictures refer to the pictures different in resolution but having the same content.

Before time t0, the switching unit 108 selects the data outputted by the Full-Seg decoding unit 106, and therefore the pictures from F1 to F4 are serially outputted by the output unit 110. The outputted pictures from F1 to F4 are shown in the display or the like.

At time t0, when the target broadcast is switched from Full Seg to One Seg, the internal counter 107 starts counting the count value 401 based on the PCR for One Seg.

The clock-synchronous decoding unit 201 in the One-Seg decoding unit 105 outputs, as the initial picture after switching, picture O7 that is outputted last by the asynchronous decoding unit 202 before the switching. Specifically, the clock-synchronous decoding unit 201 outputs picture O7 with timing that allows coincidence of the count value 401 and the PTS of picture O7.

After this, the clock-synchronous decoding unit 201 decodes a picture subsequent to picture O7, and outputs the decoded picture subsequent to picture O7 in synchronization with the count value 401 with a period of 66 msec.

In addition, after time t0, the asynchronous decoding unit 302 in the Full-Seg decoding unit 106 outputs a picture subsequent to picture F5 asynchronously with the count value 400 with a period of 33 msec (not shown).

Thus, the digital broadcast receiving apparatus 100 outputs picture O7 decoded by the asynchronous decoding unit 202 as an initial picture after switching. With this, the clock-synchronous decoding unit 201 need not decode the initial picture after switching. Therefore, the digital broadcast receiving apparatus 100 can reduce the amount of time required for outputting the initial picture after switching as compared to the case where the initial picture after switching is decoded after the switching.

Furthermore, the digital broadcast receiving apparatus 100 does not use the count value of the internal counter 107 for the decoding and outputting of the video data of the broadcast that is not selected as the target broadcast. Therefore, it is sufficient that the digital broadcast receiving apparatus 100 includes only one internal counter 107. This allows reduction of the circuit size of the digital broadcast receiving apparatus 100 as compared to the case where two internal counters 107 are included for One Seg and Full Seg.

Here, although use of the asynchronous decoding process produces an effect of reducing the circuit size, there is a problem that the timing of the picture output from the asynchronous decoding unit 202 does not coincide with the count value 401. Specifically, the asynchronous decoding unit 202 outputs pictures with timing having no relevance to the count value 401, and therefore in a case as FIG. 5 shows, the picture outputted at the switching time does not coincide with the picture outputted synchronously with the count value 401 after the switching. If this is the case, the viewer feels discomfort since picture O7 is not immediately outputted after switching. Specifically, no video data is outputted during the time from time t0 until picture O7 is outputted by the clock-synchronous decoding unit 201. Note that FIG. 5 shows, for simplicity of description, an example where output data 403 lags behind output data 402 by approximately 3 pictures, but the case where no video data is outputted for a few seconds is also assumable.

Thus, the digital broadcast receiving apparatus 100 measures the amount of time required for outputting the initial picture after switching, and uses the measured amount of time as the offset value 206 for the subsequent switching. With this, it is possible to reduce the amount of time during which no video is displayed at the moment of switching.

The offset measuring unit 204 measures an offset value 407, which is the amount of time from time t0 to until picture O7 is outputted by the clock-synchronous decoding unit 201. Specifically, the offset measuring unit 204 calculates the offset value 407 by calculating the difference between the PTS included in picture O7 outputted by the asynchronous decoding unit 202 and the count value 401 of the internal counter 107 after the switching at time t0.

The offset value 407 thus calculated is stored in the offset value 205. The offset value 407 is used as an offset value when the target broadcast is subsequently switched from One Seg to Full Seg.

Specifically, when the target broadcast is subsequently switched from One Seg to Full Seg, the asynchronous decoding unit 202 outputs pictures with timing that is delayed by as much as the offset value 407 with respect to the output timing before the offsetting. As FIG. 5 shows, this decreases the difference between the count value 401 and the timing with which the picture in the output data 406 is outputted from the asynchronous decoding unit 202.

Specifically, the asynchronous decoding unit 202 delays the output timing by as much as the offset value 407. With this, the asynchronous decoding unit 202 outputs picture O5 as output data 406 immediately before the switching (time t0). Accordingly, the clock-synchronous decoding unit 201 can promptly output picture O5 as the initial picture after switching.

Thus, the digital broadcast receiving apparatus 100 according to the embodiment of the present invention can reduce the amount of time required for outputting video data when the target broadcast is switched, by outputting, at the asynchronous decoding unit 202, the video data with timing delayed by as much as the offset value 206.

Note that the clock-synchronous decoding unit 201 is assumed here to output the picture outputted last by the asynchronous decoding unit 202 before switching; however, a plurality of pictures outputted by the asynchronous decoding unit 202 may also be temporarily stored in a buffer, so as to output a picture having the PTS immediately succeeding the count value 401 after the switching, from among the pictures stored in the buffer. Specifically, picture O5 may be outputted as output data 403 before offsetting, shown in FIG. 5, from the clock-synchronous decoding unit 201.

In this case, even when there is a certain degree of difference between the output timing of the asynchronous decoding unit 202 and the count value 401, it is possible to output picture O5 immediately after the switching. However, when there is a large difference between the output timing of the asynchronous decoding unit 202 and the count value 401, a case is assumable where the picture to be outputted immediately after the switching has already been discarded from the buffer. In this case, as with the example described earlier, the video data is not outputted for a predetermined period of time. Even if this is the case, however, the present invention, when implemented, produces an effect of reducing the amount of time required for outputting the video data. In addition, since this reduces the data amount to be temporarily stored in the buffer, it is possible to reduce the buffer capacity.

In addition, an exemplary case has been described in FIG. 5 where the output timing of the asynchronous decoding unit 202 is earlier than the count value 401. Hereinafter, the case where the output timing of the asynchronous decoding unit 202 is behind the count value 401 shall be described.

When the output timing of the asynchronous decoding unit 202 is behind the count value 401, the asynchronous decoding unit 202 has not outputted yet, at the point when the switching occurs, the picture that should be outputted after the switching. This requires the clock-synchronous decoding unit 201 to decode the initial picture outputted after the switching, and to output the decoded picture. This requires time for the video data to be outputted after the switching.

The digital broadcast receiving apparatus 100 according to the present invention calculates the offset value 206 and reflects the offset value 206 in the timing of output for the asynchronous decoding unit 202 in the subsequent switching, even when the timing of output for the asynchronous decoding unit 202 is behind the count value 401.

Specifically, the offset measuring unit 204 calculates the difference between the PTS of picture O7 outputted last by the asynchronous decoding unit 202 and the count value 401 at the switching time of the internal counter 107 after switching. Here, the calculated difference is a negative value since the PTS of the last picture outputted by the asynchronous decoding unit 202 is smaller than the count value 401. The offset value storage unit 205 stores the calculated difference as the offset value 206.

Next, when the target broadcast is switched from One Seg to Full Seg, the asynchronous decoding unit 202 outputs pictures with timing accelerated by as much as the offset value 407 with respect to the output timing before offsetting. With this, since the asynchronous decoding unit 202 has already outputted the initial picture to be outputted after switching at the time of switching from Full Seg to One Seg, the clock-synchronous decoding unit 201 need not decode the initial picture to be outputted after the switching. With this, the digital broadcast receiving apparatus 100 can reduce the amount of time required for outputting the video data after switching when the timing of output by the asynchronous decoding unit 202 is behind the count value of the internal counter 107.

Note that the operation of the digital broadcast receiving apparatus 100 when the target broadcast is switched from Full Seg to One Seg has been described with reference to FIG. 5; the digital broadcast receiving apparatus 100 operates likewise when the target broadcast is switched from One Seg to Full Seg, and the description thereof shall therefore be omitted.

As described thus far, the digital broadcast receiving apparatus 100 outputs the video data of a broadcast selected as the target broadcast in synchronization with the internal clock based on the PCR. Accordingly, the video data outputted by the digital broadcast receiving apparatus 100 should not be displayed behind the time at which the video data should actually be displayed. In other words, the digital broadcast receiving apparatus 100 does not change the timing of display.

In addition, the digital broadcast receiving apparatus 100 outputs, asynchronously with the internal clock, the video data of a broadcast that is not selected as the target broadcast. Furthermore, the digital broadcast receiving apparatus 100 uses the video data outputted by the asynchronous decoding units 202 and 302, as initial video data to be outputted when the target broadcast is switched. With this, it is possible to reduce the amount of time from when the target broadcast is switched to when the video data is outputted.

In addition, the digital broadcast receiving apparatus 100 may include only one internal counter 107 since the digital broadcast receiving apparatus 100 does not use the count value of the internal counter 107 for the decoding and outputting of the video data from a broadcast that is not selected as the target broadcast. This reduces the circuit size as compared to the case where two internal counters 107 are included for One Seg and Full Seg.

In addition, the asynchronous decoding units 202 and 302 of the digital broadcast receiving apparatus 100 output video data with timing that is delayed or accelerated by as much as the offset value with respect to the internal clock. Accordingly, it is possible to reduce the amount of time required for outputting pictures, by setting to the offset value, the amount of time that elapses from when the target broadcast is switched to when the video is displayed.

Furthermore, the digital broadcast receiving apparatus 100 measures, as the offset value, the amount of time from when the target broadcast is switched to when the video data of the switched broadcast is outputted. With this, the digital broadcast receiving apparatus 100 can reduce the amount of time required for outputting the video data in the subsequent switching, thereby reducing the discomfort caused at the moment of switching.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

An exemplary case of receiving two hierarchical layers of One Seg and Full Seg has been described above, but the present invention is not limited to this. For example, the present invention can also be applied to the case where two layers, that is, a weak layer and a strong layer of the digital satellite broadcasting are received. Note that the strong layer is low-definition compared to the weak layer, but easy to receive even when the radio wave status is poor.

In addition, the case of receiving two hierarchical layers of One Seg and Full Seg has been described above, but the present invention is also applicable to the case where more than two layers are received.

In addition, an example of switching between broadcasts such as One Seg and Full Seg that are hierarchized and broadcast in one channel has been described above, but the present invention is not limited to this. For example, the present invention may also be applicable to a digital broadcast receiving apparatus which includes pluralities of tuners 102, demodulating units 103, and TS processing units 104, and which receives and decodes different channels at the same time.

Figure 6:
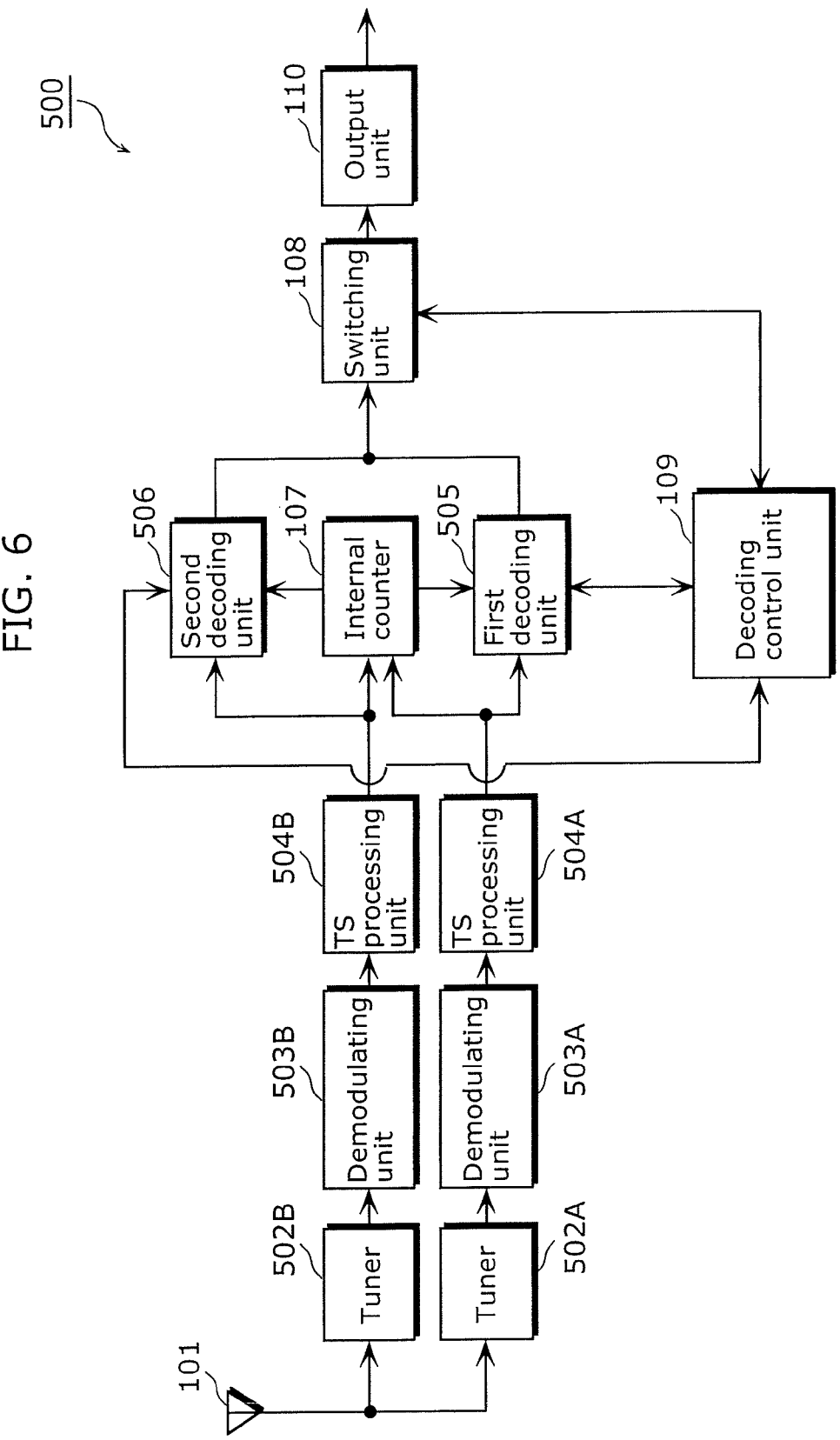
FIG. 6 is a block diagram showing a functional configuration of an exemplary modification of the digital broadcast receiving apparatus according to the embodiment of the present invention.

FIG. 6 is a diagram showing the structure of an exemplary variation of the digital broadcast receiving apparatus 100 according to the present invention. Note that the same numerical references are assigned to the same constituent elements as in FIG. 1, and therefore the detailed description thereof shall be omitted.

The digital broadcast receiving apparatus 500 shown in FIG. 6 includes: two tuners 502A and 502B, two demodulating units 503A and 503B, and two TS processing units 504A and 504B.

The tuners 502A and 502B receive radio waves of different channels, respectively. That is, two radio waves of different channels are simultaneously received by the tuners 502A and 502B.

The demodulating units 503A and 503B demodulate, respectively, the radio waves received by the tuners 502A and 502B into digital signals.

The TS processing units 504A and 504B separate, respectively, the digital signals decoded by the demodulating units 503A and 503B.

In addition, the digital broadcast receiving apparatus 500 includes a first decoding unit 505 and a second decoding unit 506 which correspond, respectively, to the One-Seg decoding unit 105 and the Full-Seg decoding unit 106 described above.

The first decoding unit 505 and the second decoding unit 506 decode, respectively, the data separated by the TS processing units 504A and 504B, and output video data to the switching unit 108.

Note that for the control of the decoding process performed by the decoding control unit 109 on the first decoding unit 505 and the second decoding unit 506 (control through the selection between clock-synchronous decoding and asynchronous decoding), it is possible to use the same method described earlier in the One Seg decoding unit 105 and the Full Seg decoding unit 106.

Thus, the present invention can be implemented as a digital broadcast receiving apparatus 500 which receives and decodes different channels simultaneously.

In addition, the offset value storage unit 205 may store an initial value that is set as the offset value 206 in advance, although the offset value storage unit 205 in the above description does not hold the offset value 206 before the offset measuring unit 204 measures the offset value 206. For example, the initial value is set by an external apparatus or the like and corresponds to the amount of time from when the target broadcast is switched from Full Seg to One Seg to the time at which the One-Seg video data is outputted.

In addition, the offset setting unit 203 may add the amount of time newly measured by the offset measuring unit 204 to the previous offset value stored in the offset value storage unit 205, and then calculate an average value of the result of the addition and the previous offset value, and stores the calculated average value in the offset value storage unit 205 as a new offset value 206.

With this, the digital broadcast receiving apparatus 100 can prevent setting of an inappropriate offset value by striking an average using the previous offset value even when the offset measuring unit 204 fails in measurement of time for reasons that the Carrier-Noise ratio (CN) is low due to poor radio wave condition, and so on.

In addition, the offset setting unit 203 may add or subtract a predetermined value to or from the amount of time measured by the offset measuring unit 204, so as to store a resulting value in the offset value storage unit 205 as the offset value 206. In addition, the offset setting unit 203 may also multiply the amount of time measured by the offset measuring unit 204 and a predetermined coefficient, so as to store the product in the offset value storage unit 205 as the offset value 206.

In addition, a plurality of offset value storage units 205 may be included which store offset values (measurement time) each of which corresponds to each of a plurality of radio waves (channels) that the tuner 102 can receive and is measured by the offset measuring unit 204 when each corresponding radio wave is received. In this case, when the radio wave (channel) to be received by the tuner 102 is changed, the offset setting unit 203 stores, as the offset value to be used for the asynchronous decoding unit 202, an offset value (measurement value) that corresponds to a radio wave (channel) after the change and is stored in one of the offset value storage units 205.

With this, the digital broadcast receiving apparatus 100 can prevent setting of an inappropriate offset value when the target radio wave (channel) to be received is changed.

In addition, the offset setting unit 203 may return the offset value to a predetermined initial value when the target radio wave (channel) to be received by the tuner 102 is changed.

With this, the offset setting unit 203 can set an appropriate offset value even when the target radio wave (channel) is changed.

In addition, the digital broadcast receiving apparatus 100 may use a predetermined offset value inputted from an external apparatus or the like, without including an offset measuring unit 204.

In addition, the decoding timing for the asynchronous decoding unit 202 may also be offset with the offset value 206 although it is assumed in the above description that the output timing for the asynchronous decoding unit 202 is offset with the offset value 206.

Note that the above exemplary variation may be applied to the Full-Seg decoding unit 106. Furthermore, the exemplary variation may also be applied to either the One-Seg decoding unit 105 or the Full-Seg decoding unit 106.

In addition, it is assumed in the above description that both the One-Seg decoding unit 105 and the Full-Seg decoding unit 106 include, respectively, the clock-synchronous decoding unit 201 and 301, and the asynchronous decoding unit 202 and 302; however, it is also applicable that only the One-Seg decoding unit 105 includes the clock-synchronous decoding unit 201 and 301, or only the Full-Seg decoding unit 106 includes the asynchronous decoding unit 202 or 302. In this case, it is also possible to reduce the switching time, in either switching from One Seg to Full Seg or switching from Full Seg to One Seg.

Although only one exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

Industrial Applicability

The present invention is applicable to a digital broadcast receiving apparatus for digital terrestrial broadcasting, digital satellite broadcasting, and so on. Specifically, the present invention is applicable to a digital broadcast receiving apparatus equipped on a mobile apparatus and a mobile body, such as an in-vehicle television, a portable television, a car navigation system, a note-type personal computer, a PDA, and a cellular phone.

What is claimed is:

1. A digital broadcast receiving apparatus which receives a radio wave including a first digital broadcast and a second digital broadcast that are compressed, and outputs video data of the first or the second digital broadcast, said digital broadcast receiving apparatus comprising:
a receiving unit configured to receive the radio wave;
a demodulating unit configured to demodulate the radio wave received by said receiving unit into a digital signal;
a counter which counts a count value using a clock generated from referential clock information included in the digital signal;

a first decoding unit configured to decode video data of the first digital broadcast included in the digital signal, and to output first video data that is decoded;

a second decoding unit configured to decode video data of the second digital broadcast included in the digital signal, and to output second video data that is decoded;

a selection unit configured to select one of the first video data outputted by said first decoding unit and the second video data outputted by said second decoding unit; and an output unit configured to output the one of the first video data and the second video data that is selected by said selection unit, wherein said first decoding unit includes:

a synchronous decoding unit configured to output, when the first video data is selected by said selection unit, the first video data when a difference between a time stamp and the count value is smaller than a predetermined value, the time stamp being included in the digital signal and indicating time at which the first video data is displayed; and an asynchronous decoding unit configured to output, when the first video data is not selected by said selection unit, the first video data with timing delayed or accelerated by as much as an offset value with respect to timing of predetermined periodicity.

2. The digital broadcast receiving apparatus according to claim 1, wherein said synchronous decoding unit is configured to output the first video data decoded by said asynchronous decoding unit as initial video data to be outputted after the video data selected by said selection unit is switched from the second video data to the initial video data, when the difference between the time stamp for the first video data and the count value is smaller than a predetermined value.

3. The digital broadcast receiving apparatus according to claim 1, wherein said asynchronous decoding unit includes an offset setting unit configured to set the offset value, said offset setting unit includes a calculating unit configured to calculate a difference value between the time stamp for the first video data and the count value, the first video data being decoded by said asynchronous decoding unit at time when the video data selected by said selection unit is switched from the second video data to the first video data, and the count value being obtained at the time, and said offset setting unit is configured to set, as the offset value, the difference value calculated by said calculating unit.

4. The digital broadcast receiving apparatus according to claim 3, wherein said offset setting unit further includes:

a storage unit in which the difference value is stored; and an addition unit configured to add a difference value newly calculated by said calculating unit to the difference value stored in said storage unit, and to store a resulting value in said storage unit as a new difference value, and said offset setting unit is configured to set, as the offset value, the new difference value stored in said storage unit.

5. The digital broadcast receiving apparatus according to claim 3, wherein said offset setting unit further includes:

a storage unit in which the difference value is stored;

an addition unit configured to add a difference value newly calculated by said calculating unit to the difference value stored in said storage unit; and an averaging unit configured to calculate an average value of the difference value added by said addition unit and the difference value stored in said storage unit, and to store the average value in said storage unit as a new difference value, and said offset setting unit is configured to set, as the offset value, the new difference value stored in said storage unit.

6. The digital broadcast receiving apparatus according to claim 3, wherein said offset setting unit is further configured to reset the offset value to a predetermined default value when the radio wave to be received by said receiving unit is changed.

7. The digital broadcast receiving apparatus according to claim 3, wherein said offset setting unit further includes a plurality of storage units in each of which the difference value is stored, said plurality of storage units corresponding to respective radio waves that can be received by said receiving unit, and the difference value being calculated by said calculating unit when a corresponding radio wave is received, and said offset setting unit is configured to set the difference value as the offset value when the radio wave to be received by said receiving unit is changed, the difference value being stored in one of said plurality of storage units that corresponds to the radio wave after the change.

8. The digital broadcast receiving apparatus according to claim 1, wherein said demodulating unit is configured to convert the radio wave into a transport stream that is the digital signal.

9. The digital broadcast receiving apparatus according to claim 1, wherein the referential clock information is Program Clock Reference (PCR), and the time stamp is Presentation Time Stamp (PTS).

10. The digital broadcast receiving apparatus according to claim 1, wherein the first digital broadcast and the second digital broadcast have different picture qualities and correspond to an identical content, and the radio wave is a radio wave in which the first digital broadcast and the second digital broadcast are hierarchized in one channel to be broadcast.

11. The digital broadcast receiving apparatus according to claim 10, wherein said first decoding unit is configured to perform decoding in accordance with MPEG2 or H. 264, and said second decoding unit is configured to perform decoding in accordance with MPEG2 or H. 264.

12. The digital broadcast receiving apparatus according to claim 10, wherein one of the first digital broadcast and the second digital broadcast is a full-segment broadcast in digital terrestrial broadcasting, and an other of the first digital broadcast and the second digital broadcast is a one-segment broadcast in digital terrestrial broadcasting.

13. The digital broadcast receiving apparatus according to claim 10,
wherein one of the first digital broadcast and the second digital broadcast is a weak-layer broadcast in digital satellite broadcasting, and
an other of the first digital broadcast and the second digital broadcast is a strong-layer broadcast in digital satellite broadcasting.

14. The digital broadcast receiving apparatus according to claim 1,
wherein the first digital broadcast and the second digital broadcast correspond to different channels,
said receiving unit is configured to receive two radio waves of different channels simultaneously,
said demodulating unit is configured to demodulate the two radio waves received by said receiving unit into a first digital signal and a second digital signal, respectively,
said first decoding unit is configured to decode the video data of the first digital broadcast included in the first digital signal, and to output the first video data that is decoded, and
said second decoding unit is configured to decode the video data of the second digital broadcast included in the second digital signal, and to output the second video data that is decoded.

15. A semiconductor integrated circuit which decodes video data of a first digital broadcast and a second digital broadcast from a radio wave including the first digital broadcast and the second digital broadcast that are compressed, and outputs video data of the first or the second digital broadcast, said semiconductor integrated circuit comprising:
a demodulating unit configured to demodulate the radio wave into a digital signal;
a counter which counts a count value using a clock generated from referential clock information included in the digital signal;
a first decoding unit configured to decode video data of the first digital broadcast included in the digital signal, and to output first video data that is decoded;
a second decoding unit configured to decode video data of the second digital broadcast included in the digital signal, and to output second video data that is decoded;
a selection unit configured to select one of the first video data outputted by said first decoding unit and the second video data outputted by said second decoding unit; and
an output unit configured to output the one of the first video data and the second video data that is selected by said selection unit,
wherein said first decoding unit includes:
a synchronous decoding unit configured to output, when the first video data is selected by said selection unit, the first video data when a difference between a time stamp and the count value is smaller than a predetermined value, the time stamp being included in the digital signal and indicating time at which the first video data is displayed; and
an asynchronous decoding unit configured to output, when the first video data is not selected by said selection unit, the first video data with timing delayed or accelerated by as much as an offset value with respect to timing of predetermined periodicity.

16. A digital broadcast receiving method for use in a digital broadcast receiving apparatus which decodes video data of a first digital broadcast and a second digital broadcast from a radio wave including the first and the second digital broadcasts that are compressed, and outputs video data of the first or the second digital broadcast,
wherein the digital broadcast receiving apparatus includes:
a demodulating unit configured to demodulate the radio wave into a digital signal;
a counter which counts a count value using a clock generated from referential clock information included in the digital signal;
a first decoding unit configured to decode video data of the first digital broadcast included in the digital signal, and to output first video data that is decoded;
a second decoding unit configured to decode video data of the second digital broadcast included in the digital signal, and to output second video data that is decoded;
a selection unit configured to select one of the first video data outputted by the first decoding unit and the second video data outputted by the second decoding unit; and
an output unit configured to output the one of the first video data and the second video data that is selected by the selection unit, and
said digital broadcast receiving method comprises:
causing the first decoding unit to output, when the first video data is selected by the selection unit, the first video data when a difference between a time stamp and the count value is smaller than a predetermined value, the time stamp being included in the digital signal and indicating time at which the first video data is displayed; and
causing the first decoding unit to output, when the first video data is not selected by the selection unit, the first video data with timing delayed or accelerated by as much as an offset value with respect to the timing of predetermined periodicity.

17. A non-transitory computer readable medium storing a computer program product which, when loaded into a digital broadcast receiving apparatus, allows the apparatus to execute a method for a program for a digital broadcast receiving method for use in the digital broadcast receiving apparatus which demodulates video data of a first digital broadcast and a second digital broadcast from a radio wave including the first digital broadcast and the second digital broadcast that are compressed, and outputs video data of the first or the second digital broadcast,
wherein the digital broadcast receiving apparatus includes:
a demodulating unit configured to demodulate the radio wave into a digital signal;
a counter which counts a count value using a clock generated from referential clock information included in the digital signal;
a first decoding unit configured to decode video data of the first digital broadcast included in the digital signal, and to output first video data that is decoded;
a second decoding unit configured to decode video data of the second digital broadcast included in the digital signal, and to output second video data that is decoded;
a selection unit configured to select one of the first video data outputted by the first decoding unit and the second video data outputted by the second decoding unit; and
an output unit configured to output the one of the first video data and the second video data that is selected by the selection unit, and
said computer program product causes a computer to execute:
causing the first decoding unit to output, when the first video data is selected by the selection unit, the first video data when a difference between a time stamp and the count value is smaller than a predetermined value, the time stamp being included in the digital signal and indicating time at which the first video data is displayed; and
causing the first decoding unit to output, when the first video data is not selected by the selection unit, the first video data with timing delayed or accelerated by as much as an offset value with respect to timing of predetermined periodicity.

* * * * *